US006985017B2

(12) United States Patent
Gao

(10) Patent No.: US 6,985,017 B2
(45) Date of Patent: Jan. 10, 2006

(54) METHOD AND SYSTEM FOR PULSE WAVEFORM VARIABLE EDGE CONTROL

(75) Inventor: Feng Gao, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 163 days.

(21) Appl. No.: 10/756,481

(22) Filed: Jan. 13, 2004

(65) Prior Publication Data

US 2005/0151573 A1 Jul. 14, 2005

(51) Int. Cl.
*H03K 5/12* (2006.01)

(52) U.S. Cl. ...................................... 327/170; 327/263

(58) Field of Classification Search ................ 327/170, 327/263

See application file for complete search history.

(56) References Cited

U.S. PATENT DOCUMENTS 4,766,328 A * 8/1988 Yang .......................... 307/106
4,908,526 A * 3/1990 Mefford ...................... 327/180
5,389,828 A * 2/1995 Tago .......................... 327/263

* cited by examiner

*Primary Examiner*—Minh Nguyen

(57) ABSTRACT

A method and system for providing variable edge control of pulse waveforms is provided. A positive edge DAC number is set so that the positive edge time of a first pulse waveform of some amplitude is substantially equal to some initial edge time. Similarly, a second positive edge DAC number associated with a second pulse waveform of different amplitude is set so that the positive edge time of the second pulse waveform also equals the initial edge time. Positive gain and offset factors are then generated so that a third positive edge DAC number associated with any pulse waveform may be calculated so that a desired positive edge time of that waveform is produced. Negative edge DAC numbers may be calculated in a similar manner so that the positive and negative edge times of a pulse waveform may be balanced, or more efficient methods may be used.

16 Claims, 2 Drawing Sheets

METHOD AND SYSTEM FOR PULSE WAVEFORM VARIABLE EDGE CONTROL

BACKGROUND OF THE INVENTION

For many years now, one common form of electronics test equipment used by electronics designers has been signal sources. One type of signal source of particular importance is the pulse generator. Typically, pulse generators are designed to produce an electronic pulse signal consisting of a series of one or more pulses, such as a voltage pulse $V_P$ shown in FIG. 1. Normally, various parameters describing the pulse signal, such as its amplitude $V_{pp}$, positive edge (rise) time $T_{pET}$ associated with a rising edge 1, negative edge (fall) time $T_{nET}$ associated with a falling edge 2, frequency (not denoted), and duty cycle (also not denoted), are selectable by the pulse generator user. Additionally, pulse generators typically operate in several different voltage amplitude ranges, such as zero to 0.1 volts, zero to one volt, zero to ten volts, and so on, with the smaller ranges generally providing greater voltage resolution than larger ranges.

Specifically with respect to the programmability of the pulse rise and fall times, user selection of the positive and negative edge times $T_{pET}$, $T_{nET}$ of the pulse $V_P$ allows variable edge control of the pulse generator. Typically, the positive edge time $T_{pET}$ of the voltage pulse $V_P$ is defined as the time required for the voltage to rise from ten percent to ninety percent of its amplitude $V_{pp}$ (i.e., 0.1 $V_{pp}$ to 0.9 $V_{pp}$) as shown in FIG. 1. Similarly, the negative edge time $T_{nET}$ of the pulse $V_P$ is commonly defined as the time require for the voltage to fall from ninety percent to ten percent of its amplitude $V_{pp}$.

Users of pulse generators currently desire at least two characteristics of user-selectable variable edge control. First, a pulse generator should have the capability to maintain balanced, or substantially equal, positive and negative edge times $T_{pET}$, $T_{nET}$ as specified by the user so that less user manipulation of the pulse generator is required. Furthermore, the positive and negative edge times $T_{pET}$, $T_{nET}$ selected by the user should be held substantially constant while the amplitude $V_{pp}$ is altered through a large dynamic range so that less user manipulation of the generator is required when changing the amplitude $V_{pp}$ of the pulse $V_P$.

Currently, some pulse generators employ variable edge control that exhibits these attributes. Those generators that provide these advantages normally require a calibration process whereby two different edge times within each voltage range are used. The edge times are normally set by way of a digital value resident in a digital-to-analog converter (DAC) for each of the negative and positive edge times. These four DAC values (a negative and positive edge time value for each of the two edge times used) are then employed to calculate a gain and offset value for the particular voltage range. The gain and offset values are then used to determine DAC values for other positive and negative edge times within that voltage range to maintain balanced variable edge control.

Given some electronic circuit differences between each voltage range, such a method of calibration normally must be performed separately for each voltage range of the pulse generator. Additionally, since the calibration is performed independent of the actual voltage amplitude of the pulse being used, such a calibration is effective only if pulse amplitude and edge times are independent. In other words, if altering the pulse amplitude also alters the positive or negative edge times without a change in the DAC value associated with the edge times, pulse amplitude and edge time are interrelated, and the aforementioned calibration procedure will not operate effectively on such a pulse generator.

From the foregoing, then, a need exists for an improved variable edge control method that applies to a wider range of pulse generation circuits.

SUMMARY OF THE INVENTION

Embodiments of the invention, to be discussed in detail below, provide a method and system for providing variable edge control of pulse waveforms produced by pulse generators and similar devices. According to embodiments of the method, a first amplitude for a first pulse waveform is selected. A positive edge DAC number is then set so that the positive edge time of the first pulse waveform is substantially equal to some initial edge time. Similarly, a second amplitude for a second pulse waveform is selected. Accordingly, a second positive edge DAC number is set so that the positive edge time of the second pulse waveform is substantially equal to the initial edge time. A positive gain factor and a positive offset factor are then generated for calculating a third positive edge DAC number so that the positive edge time of any pulse waveform of some amplitude substantially equals a desired edge time. A negative edge DAC number for the third pulse waveform may then be calculated in a similar manner so that the positive and negative edge times of the third pulse waveform may be balanced. Alternately, identifiable mathematical relationships between the positive and negative edge DAC numbers may allow a simplified calculation for the negative edge DAC number. Furthermore, calculation of the negative edge DAC number may occur prior to that for the positive edge DAC number.

Other aspects and advantages of the invention will become apparent from the following detailed description, taken in conjunction with the accompanying drawings, illustrating by way of example the principles of the invention.

DETAILED DESCRIPTION OF THE PREFERRED EMBODIMENTS

Figure 1:
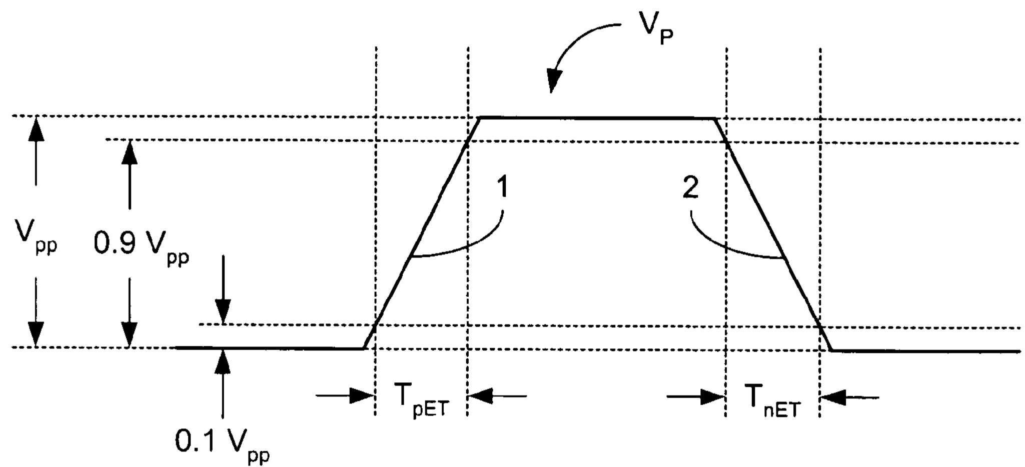
FIG. 1 is a waveform diagram of an example voltage pulse signal generated by a pulse generator.

Before describing the method embodiments of the invention herein disclosed, a block diagram of a portion of a pulse generator 100 upon which the method embodiments may operate is shown in FIG. 1. A pulse circuit 110 is primarily responsible for generating an intermediate pulse waveform $V_A$ based on several inputs received. For example, the amplitude of the intermediate pulse waveform $V_A$ is determined by an amplitude DAC voltage $V_{aDAC}$, which is generated by an amplitude DAC 120 and is based on an amplitude DAC number $N_{aDAC}$. The higher the amplitude DAC number $N_{aDAC}$, the higher the amplitude of the intermediate pulse waveform $V_A$.

The pulse circuit 110 also accepts two inputs that allow modification of the slew rate of both the rising and falling edges of the intermediate pulse waveform $V_A$. The slew rate is the rate at which the voltage changes per unit time. The slew rate of the rising edge of that pulse is controlled by a positive edge DAC voltage $V_{pDAC}$, which is generated by a positive edge DAC 130 and is based on a positive edge DAC number $N_{pDAC}$. The higher the positive edge DAC number $N_{pDAC}$, the higher the slew rate. Likewise, the slew rate of the falling edge of the intermediate pulse waveform $V_A$ is controlled by a negative edge DAC voltage $V_{nDAC}$, which is generated by a negative edge DAC 140 and is based on a negative edge DAC number $N_{nDAC}$. Opposite to the response of the pulse circuit 110 to the positive edge DAC number $N_{pDAC}$, the higher the negative edge DAC number $N_{nDAC}$, the lower the slew rate.

The DAC numbers $N_{aDAC}$, $N_{pDAC}$ and $N_{nDAC}$ may be represented within the pulse circuit 100 by any of a number of typical digital formats, such as unsigned binary, one's complement, two's complement, and so on. Any such format may be employed successfully in various embodiments of the invention.

Typically, other characteristics of the voltage pulse $V_P$, such as frequency and duty cycle, are controlled by other circuits within the pulse generator 100. However, since such circuits do not directly affect the method embodiments of the present invention, which concern pulse variable edge control, those circuits are not shown in FIG. 2, nor are they described herein.

Figure 2:
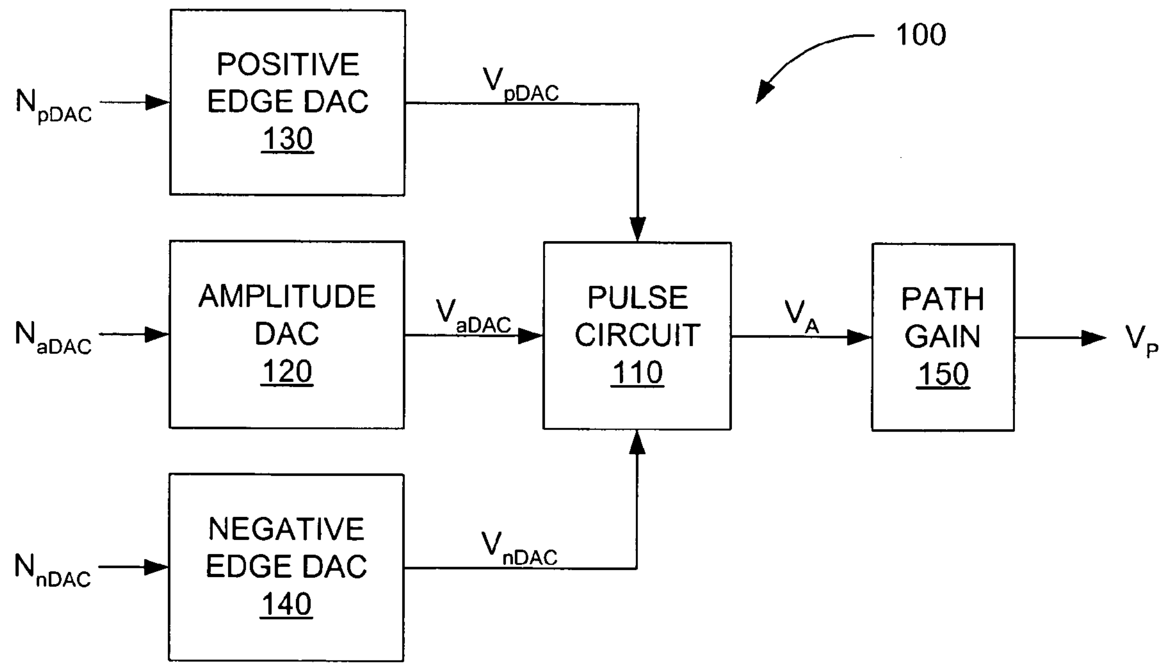
FIG. 2 is a block diagram of a pulse generator upon which embodiments of the invention may operate.

Other pulse circuits that exhibit the same or similar aforementioned characteristics of the pulse circuit 110 of FIG. 2 have been produced in the prior art. In pulse generators in which such pulse circuits have been employed, one feature common to many is that the amplitude and the edge times of the intermediate pulse waveform $V_A$ are interrelated (i.e., not independent). For example, as the amplitude of the intermediate pulse waveform $V_A$ is increased, and the slew rates of the rising and falling edges are held constant, the positive and negative edge times of the intermediate pulse waveform VA are expanded proportionally. This complication typically makes control of the DAC values $N_{aDAC}$, $N_{pDAC}$, and $N_{nDAC}$ more difficult when maintaining balanced edge times than in pulse generators in which amplitude and edge time are independent.

To further complicate the matter, the pulse generator 100 normally includes some substantially linear voltage gain associated with the signal path between the pulse circuit 110 and output signal representing the voltage pulse $V_P$ ultimately produced by the pulse generator 110. This gain is shown as a path gain 150 in FIG. 2. As a result, the amplitude of the intermediate pulse waveform $V_A$ is decreased or increased by some factor, resulting in the voltage pulse waveform $V_P$, thereby affecting the edge times $T_{pET}$, $T_{nET}$ of its rising and falling edges 1, 2.

Figure 3:
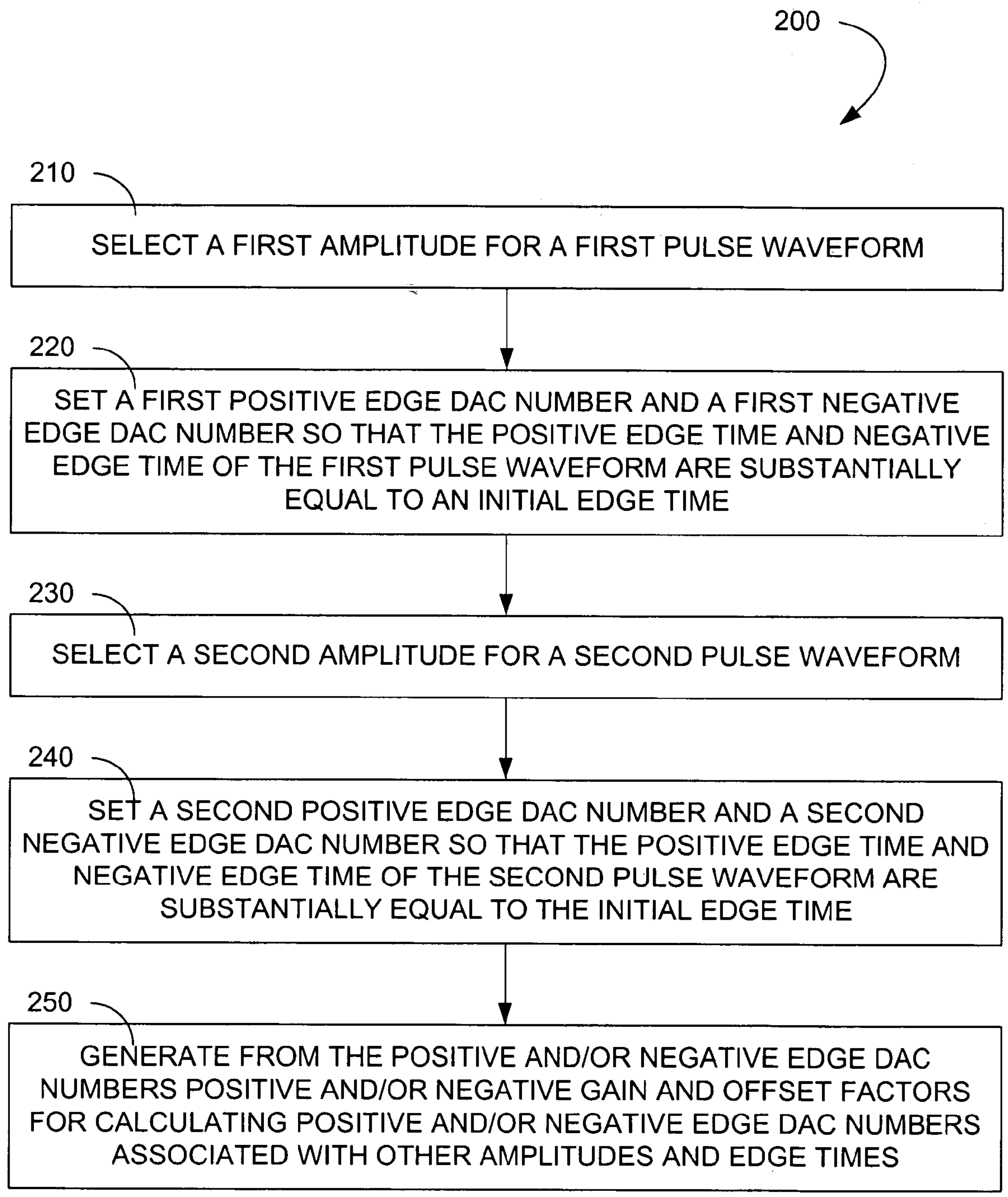
FIG. 3 is a flow diagram of a method for pulse waveform variable edge control according to an embodiment of the invention.

Given such a pulse generator 100, a method 200 according to an embodiment of the invention, as shown in FIG. 3, begins with selecting a first amplitude $V_{pp1}$ for a first voltage pulse waveform $V_{P1}$, by setting the amplitude DAC number $N_{aDAC}$ so that the required amplitude is attained (step 210). In some embodiments, the amplitude $V_{pp1}$ should be near the top of the amplitude range provided by the pulse generator 100 to allow the proceeding calculations to be performed over a greater dynamic range of the instrument. At that amplitude, the positive and negative edge DAC numbers $N_{pDAC}$, $N_{nDAC}$ are set so that the edge times of the rising and falling edges 1, 2 of the first voltage pulse waveform $V_{P1}$ are substantially equal (step 220). Ordinarily, these edge times are set close to the maximum allowed by the pulse generator 100, although that is not strictly necessary. The resulting positive and negative edge DAC numbers $N_{pDAC}$, $N_{nDAC}$ required for this particular operating condition will hereinafter be referred to as $N_{pDAC1}$, and $N_{nDAC1}$, respectively. Furthermore, the resulting positive and negative edge times $T_{pET}$, $T_{nET}$ in this case are $T_{pET1}$ and $T_{nET1}$, which are substantially equal.

Similarly, a second amplitude $V_{pp2}$ is then selected (step 230), resulting in a second voltage pulse waveform $V_{P2}$, preferably near the bottom of the amplitude range of the pulse generator 100, by setting the amplitude DAC number $N_{aDAC}$ so that the required amplitude is attained. The positive and negative edge DAC numbers $N_{pDAC}$, $N_{nDAC}$ are then set (step 240) to provide positive and negative edge times $T_{pET}$, $T_{nET}$ that are substantially equal to each other, and substantially equal to those associated with $V_{pp1}$, namely $T_{pET1}$ and $T_{nET1}$. The resulting positive and negative edge DAC numbers $N_{pDAC}$, $N_{nDAC}$ are thus termed $N_{pDAC2}$ and $N_{nDAC2}$, respectively.

Using the numbers produced up to this point (namely, $V_{pp1}$, $N_{pDAC1}$, $N_{nDAC1}$, $V_{pp2}$, $N_{pDAC2}$, $N_{nDAC2}$, and $T_{pET1}$ (equal to $T_{nET1}$)), a set of gain (GainFactor) and offset (OffsetFactor) factors may then be generated (step 250). In one embodiment of the invention, these values allow the calculation of the proper values for the positive and negative edge DAC numbers $N_{pDAC}$, $N_{nDAC}$ for a particular amplitude $V_{pp}$ and balanced edge time $T_{ET}$ (equal to each of the positive and negative edge times $T_{pET}$, $T_{nET}$) for a voltage pulse waveform $V_P$. In the particular case of first determining a positive edge DAC number $N_{pDAC}$, a positive gain factor $GainFactor_p$ and a positive offset factor $OffsetFactor_p$ would be generated. More specifically, the slew rate of the intermediate pulse waveform $V_A$ at the output of the pulse circuit 110 is multiplied by the calculated positive gain factor $GainFactor_p$, and then is offset by the calculated positive offset factor $OffsetFactor_p$ to calculate $N_{pDAC}$. Given that a PathGain is a constant gain factor resulting from the path gain 150, the slew rate of $V_A$ is determined by the rise in voltage from 0.1 $V_{pp}$ to 0.9 $V_{pp}$ at the voltage pulse waveform $V_P$ (equal to 0.8 $V_{pp}$), divided by the PathGain (thus giving the voltage rise from 0.1 to 0.9 of the amplitude of $V_A$), divided by the edge time $T_{ET}$. As a result, $N_{pDAC}$ may then be calculated as follows:

$$N_{pDAC} = \frac{0.8 * V_{pp} * GainFactor_p}{PathGain * T_{ET}} + OffsetFactor_p$$

Once the positive edge DAC number $N_{pDAC}$ is calculated, the negative edge DAC number $N_{nDAC}$ may be calculated assuming that the sum of the positive and negative edge DAC numbers $N_{pDAC}$, $N_{nDAC}$, herein called DacSum, is a constant for all balanced edge times (i.e., $T_{ET}=T_{pET}=T_{nET}$).

$$N_{nDAC} = DacSum - N_{pDAC}$$

This equation assumes that the pulse circuit 110 operates in a "balanced" fashion, which means the average of the $N_{pDAC}$ and $N_{nDAC}$ remains constant for all cases in which the positive and negative edge times $T_{pET}$, $T_{nET}$ are substantially equal. In other words, the positive and negative edge slew rates each change the same amount per increment or decrement in the associated positive or negative edge DAC number $N_{pDAC}$, $N_{nDAC}$ about DacSum/2, which represents the average of any two edge DAC numbers that represent a balanced positive and negative edge time.

In cases in which the pulse circuit 110 does not operate in such a balanced manner, the negative edge DAC number $N_{nDAC}$ for a desired amplitude $V_{pp}$ and balanced edge time $T_{ET}$ for the voltage pulse waveform $V_P$ may be calculated separately in a fashion analogous to that performed for the positive edge DAC number $N_{pDAC}$, as described above:

$$N_{nDAC} = \frac{0.8 * V_{pp} * GainFactor_n}{PathGain * T_{ET}} + OffsetFactor_n$$

In this case, a separate negative gain factor $GainFactor_n$ and a negative offset factor $OffsetFactor_n$ associated with the negative edge DAC number $N_{nDAC}$ would be required. In order to calculate (step 250) the proper values for $GainFactor_p$, $OffsetFactor_p$, $GainFactor_n$, $OffsetFactor_n$, and DacSum, identifying some operational characteristics of the pulse circuit 110 is useful. For example, assume that for a constant positive edge time $T_{pET}$ (=$T_{ET}$) the amplitude $V_{pp}$ of the voltage pulse waveform $V_P$ varies substantially linearly with the positive edge time DAC number $N_{pDAC}$. As a result, the $GainFactor_p$ would represent the slope of a line denoting the relationship between the positive edge DAC number $N_{pDAC}$ and the slew rate of the positive edge of a pulse at the output of the pulse circuit 110. The two data points collected for the positive edge DAC number $N_{pDAC}$ ($N_{pDAC1}$ at $V_{pp1}$ and $N_{pDAC2}$ at $V_{pp2}$) for a particular balanced edge time $T_{ET1}=T_{pET1}=T_{nET1}$, are used to determine the slope of that line. More specifically, the positive gain factor $GainFactor_p$ is the reciprocal of the difference of the slew rates of the two data points at the output of the pulse circuit 110 $(((0.8*V_{pp1}/T_{pET1})/PathGain)-(0.8*V_{pp2}/T_{pET1})/PathGain))$ divided by the difference in the positive edge DAC numbers $(N_{pDAC1}-N_{pDAC2})$. After algebraic manipulation, the equation for $GainFactor_p$ is reduced to the following:

$$GainFactor_p = \frac{(N_{pDAC1} - N_{pDAC2}) * T_{pET1} * PathGain}{0.8 * (V_{pp1} - V_{pp2})}$$

Mathematically, $OffsetFactor_p$ is a constant offset value for the line describing the relationship between the positive edge DAC number $N_{pDAC}$ and the slew rate of the positive edge of a pulse at the output of the pulse circuit 110. In other words, $OffsetFactor_p$ is an offset applied to the value for $N_{pDAC}$ derived from the use of $GainFactor_p$ to achieve a final $N_{pDAC}$ for a particular amplitude $V_{pp}$ and edge time $T_{ET}$. To determine $OffsetFactor_p$, a line defined by the two data points mentioned above ($N_{pDAC1}$ at $V_{pp1}$ and $N_{pDAC2}$ at $V_{pp2}$) on an $N_{pDAC}$ vs. $V_{pp}$ diagram is assumed, and the point at which the line crosses the axis for $N_{pDAC}$ serves as $OffsetFactor_p$. Using the first data point as a base and the basic line equation y=mx+b, where m is the slope of the line, and b is the y-axis-intercept of the line, this relationship may be stated mathematically as follows:

$$N_{pDAC1}=(Slope*V_{pp1})+OffsetFactor_p$$

Given that the slope of the line is determined by the data points $((N_{pDAC1}-N_{pDAC2})/(V_{pp1}-V_{pp2}))$, the preceding equation may be solved for $OffsetFactor_p$:

$$OffsetFactor_p = N_{pDAC1} - \frac{(N_{pDAC1} - N_{pDAC2}) * V_{pp1}}{V_{pp1} - V_{pp2}}$$

Once $GainFactor_p$ and $OffsetFactor_p$ have been ascertained, the positive edge DAC number $N_{pDAC}$ for any positive edge time $T_{pET}$ and amplitude $V_{pp}$ may be calculated across all voltage ranges of the pulse generator 100.

Please note that since the value of the negative edge DAC number $N_{nDAC}$ does not directly affect the positive edge time $T_{pET}$, the negative edge DAC number $N_{nDAC}$ does not appear in the calculations for the positive gain factor $GainFactor_p$ and the positive offset factor $OffsetFactor_p$. Likewise, since the positive edge DAC number $N_{pDAC}$ does not affect the negative edge time $T_{nET}$, the positive edge DAC number $N_{pDAC}$ does not appear in similar calculations for the negative gain factor $GainFactor_n$ and the negative offset factor $OffsetFactor_n$.

At this point, the negative edge DAC number $N_{nDAC}$ may be calculated in varying ways. For example, if no definable relationship is ascertained between the positive edge DAC number $N_{pDAC}$ and the negative edge DAC number $N_{nDAC}$ when the positive and negative edge times $T_{pET}$, $T_{nET}$ are balanced, the negative edge DAC number $N_{nDAC}$ may be calculated directly in a manner analogous to that described above for the positive edge DAC number $N_{pDAC}$. In other words, given the two data points collected earlier for the negative edge DAC number $N_{nDAC}$ ($N_{nDAC1}$ at $V_{pp1}$ and $N_{nDAC2}$ at $Vpp_2$) for a particular balanced edge time $T_{ET1}=T_{pET1}=T_{nET1}$, the negative edge DAC number $N_{nDAC}$ for any amplitude $V_{pp}$ and balanced edge time $T_{ET}$ within the capability of the pulse generator is calculated similarly to that described above:

$$N_{nDAC} = \frac{0.8 * V_{pp} * GainFactor_n}{PathGain * T_{ET}} + OffsetFactor_n$$

where, $$GainFactor_n = \frac{(N_{nDAC1} - N_{nDAC2}) * T_{nET1} * PathGain}{0.8 * (V_{pp1} - V_{pp2})}$$

and $$OffsetFactor_n = N_{nDAC1} - \frac{(N_{nDAC1} - N_{nDAC2}) * V_{pp1}}{V_{pp1} - V_{pp2}}$$

As noted above, in some pulse generators a definable mathematical relationship exists between the positive and negative DAC numbers $N_{pDAC}$, $N_{nDAC}$ for balanced edge times $T_{pET}=T_{nET}$. In such cases, other embodiments of the invention may be employed to simplify the calculation of those numbers. For example, the pulse generator 100 may be designed such that $N_{pDAC}$ and $N_{nDAC}$ are related such that the sum of the two, herein called DacSum, is always a constant in the balanced state:

$$DacSum=N_{pDAC}+N_{nDAC}$$

In such cases, once either $N_{pDAC}$ or $N_{nDAC}$ have been determined, the above equation allows the opposing DAC number to be calculated directly by subtracting the known DAC number from DacSum.

One of several methods may be employed to calculate DacSum, given the data points collected above. For example, DacSum may be calculated by adding the positive and negative edge DAC numbers associated with those data points:

$$DacSum=N_{pDAC1}+N_{nDAC1}$$

or $$DacSum=N_{pDAC2}+N_{nDAC2}$$

Alternatively, to incorporate both sets of data points collected, an average of the two above equations may be utilized to generate DacSum:

$$DacSum = \frac{N_{pDAC1} + N_{nDAC1} + N_{pDAC2} + N_{nDAC2}}{2}$$

Such an equation may help provide a useful DacSum in cases where the sum of $N_{pDAC}$ and $N_{nDAC}$ over a range of amplitudes $V_{pp}$ and balanced edge times $T_{ET}$ exhibit slight variations.

Given the simplistic nature of the calculations involved in implementing the aforementioned methods for calculating $N_{pDAC}$ and $N_{nDAC}$, method embodiments of the invention are easily automated, typically by way of software or embedded firmware associated with the pulse generator 100. Additionally, these methods have been shown to generate gain and offset factors as described above which work well over all voltage ranges provided by the pulse generator 100.

From the foregoing, embodiments of the invention provide improved methods for pulse waveform edge control, such as that performed by pulse generators. However, specific embodiments of the invention other than those shown above are also possible. For example, while embodiments of the invention herein disclosed have been described in conjunction with voltage pulse waveforms, variable edge control of waveforms involving other physical characteristics, such as current, may also benefit from alternate embodiments. Also, embodiments of the invention may be used in conjunction with other forms of electronics equipment, such as general-purpose waveform generators, or electronics equipment residing outside the test and measurement realm. As a result, the invention is not to be limited to the specific forms so described and illustrated; the invention is limited only by the claims.

What is claimed is:

1. A method for providing variable edge control of pulse waveforms, comprising:

selecting a first amplitude for a first pulse waveform;

setting a first positive edge digital-to-analog converter (DAC) number so that the positive edge time of the first pulse waveform is substantially equal to an initial edge time;

selecting a second amplitude for a second pulse waveform;

setting a second positive edge DAC number so that the positive edge time of the second pulse waveform is substantially equal to the initial edge time; and generating from the first and second positive edge DAC numbers a positive gain factor and a positive offset factor to be used in calculating a third positive edge DAC number so that the positive edge time of a third pulse waveform of a third amplitude substantially equals a desired edge time.

2. The method of claim 1, wherein the generating step comprises:

multiplying the difference between the first and second positive edge DAC numbers by the initial edge time and a path gain, divided by 0.8 and the difference between the first and second amplitudes, to obtain the positive gain factor; and subtracting from the first positive edge DAC number the difference between the first and second positive edge DAC numbers, multiplied by the first amplitude, divided by the difference between the first and second amplitudes, to obtain the positive offset factor, whereby the third positive edge DAC number is the positive gain factor, multiplied by 0.8 and the third amplitude, divided by the path gain and the desired edge time, plus the positive offset factor.

3. The method of claim 1, further comprising:

setting a first negative edge DAC number so that the negative edge time of the first pulse waveform is substantially equal to the initial edge time; and adding together the first positive and negative edge DAC numbers to obtain a DAC sum, whereby a third negative edge DAC number producing a negative edge time for the third pulse waveform equal to the desired edge time is the difference between the DAC sum and the third positive edge DAC number.

4. The method of claim 1, further comprising:

setting a second negative edge DAC number so that the negative edge time of the second pulse waveform is substantially equal to the initial edge time; and adding together the second positive and negative edge DAC numbers to obtain a DAC sum, whereby a third negative edge DAC number producing a negative edge time for the third pulse waveform equal to the desired edge time is the difference between the DAC sum and the third positive edge DAC number.

5. The method of claim 1, further comprising:

setting a first negative edge DAC number so that the negative edge time of the first pulse waveform is substantially equal to the initial edge time;

setting a second negative edge DAC number so that the negative edge time of the second pulse waveform is substantially equal to the initial edge time; and adding together the first and second positive DAC numbers and the first and second negative edge DAC numbers, divided by two, to obtain a DAC sum, whereby a third negative edge DAC number producing a negative edge time for the third pulse waveform equal to the desired edge time is the difference between the DAC sum and the third positive edge DAC number.

6. The method of claim 1, further comprising:

setting a first negative edge DAC number so that the negative edge time of the first pulse waveform is substantially equal to the initial edge time;

setting a second negative edge DAC number so that the negative edge time of the second pulse waveform is substantially equal to the initial edge time;

multiplying the difference between the first and second negative edge DAC numbers by the initial edge time and a path gain, divided by 0.8 and the difference between the first and second amplitudes, to obtain a negative gain factor; and subtracting from the first negative edge DAC number the difference between the first and second negative edge DAC numbers, multiplied by the first amplitude, divided by the difference between the first and second amplitudes, to obtain a negative offset factor, whereby a third negative edge DAC number producing a negative edge time for the third pulse waveform equal to the desired edge time is the negative gain factor, multiplied by 0.8 and the third amplitude, divided by the path gain and the desired edge time, plus the negative offset factor.

7. A program storage medium readable by a computer system embodying a program executable by the computer system to perform the method of claim 1.

8. A method for providing variable edge control of pulse waveforms, comprising:

selecting a first amplitude for a first pulse waveform;

setting a first negative edge digital-to-analog converter (DAC) number so that the negative edge time of the first pulse waveform is substantially equal to an initial edge time;

selecting a second amplitude for a second pulse waveform;

setting a second negative edge DAC number so that the negative edge time of the second pulse waveform is substantially equal to the initial edge time; and generating from the first and second negative edge DAC numbers a negative gain factor and a negative offset factor to be used in calculating a third negative edge DAC number so that the negative edge time of a third pulse waveform of a third amplitude substantially equals a desired edge time.

9. The method of claim 8, wherein the generating step comprises:

multiplying the difference between the first and second negative edge DAC numbers by the initial edge time and a path gain, divided by 0.8 and the difference between the first and second amplitudes, to obtain the negative gain factor; and subtracting from the first negative edge DAC number the difference between the first and second negative edge DAC numbers, multiplied by the first amplitude, divided by the difference between the first and second amplitudes, to obtain the negative offset factor, whereby the third negative edge DAC number is the negative gain factor, multiplied by 0.8 and the third amplitude, divided by the path gain and the desired edge time, plus the negative offset factor.

10. The method of claim 8, further comprising:

setting a first positive edge DAC number so that the positive edge time of the first pulse waveform is substantially equal to the initial edge time; and adding together the first positive and negative edge DAC numbers to obtain a DAC sum, whereby a third positive edge DAC number producing a positive edge time for the third pulse waveform equal to the desired edge time is the difference between the DAC sum and the third negative edge DAC number.

11. The method of claim 8, further comprising:

setting a second positive edge DAC number so that the positive edge time of the second pulse waveform is substantially equal to the initial edge time; and adding together the second positive and negative edge DAC numbers to obtain a DAC sum, whereby a third positive edge DAC number producing a positive edge time for the third pulse waveform equal to the desired edge time is the difference between the DAC sum and the third negative edge DAC number.

12. The method of claim 8, further comprising:

setting a first positive edge DAC number so that the positive edge time of the first pulse waveform is substantially equal to the initial edge time;

setting a second positive edge DAC number so that the positive edge time of the second pulse waveform is substantially equal to the initial edge time; and adding together the first and second positive DAC numbers and the first and second negative edge DAC numbers, divided by two, to obtain a DAC sum, whereby a third positive edge DAC number producing a positive edge time for the third pulse waveform equal to the desired edge time is the difference between the DAC sum and the third negative edge DAC number.

13. The method of claim 8, further comprising:

setting a first positive edge DAC number so that the positive edge time of the first pulse waveform is substantially equal to the initial edge time;

setting a second positive edge DAC number so that the positive edge time of the second pulse waveform is substantially equal to the initial edge time;

multiplying the difference between the first and second positive edge DAC numbers by the initial edge time and a path gain, divided by 0.8 and the difference between the first and second amplitudes, to obtain a positive gain factor; and subtracting from the first positive edge DAC number the difference between the first and second positive edge DAC numbers, multiplied by the first amplitude, divided by the difference between the first and second amplitudes, to obtain a positive offset factor, whereby a positive edge DAC number producing a positive edge time for the third pulse waveform equal to the desired edge time is the positive gain factor, multiplied by 0.8 and the third amplitude, divided by the path gain and the desired edge time, plus the positive offset factor.

14. A program storage medium readable by a computer system embodying a program executable by the computer system to perform the method of claim 8.

15. A system for providing variable edge control of pulse waveforms, comprising:

means for selecting a first amplitude for a first pulse waveform;

means for setting a first positive edge digital-to-analog converter (DAC) number so that the positive edge time of the first pulse waveform is substantially equal to an initial edge time;

means for selecting a second amplitude for a second pulse waveform;

means for setting a second positive edge DAC number so that the positive edge time of the second pulse waveform is substantially equal to the initial edge time; and means for generating from the first and second positive edge DAC numbers a positive gain factor and a positive offset factor to be used in calculating a third positive edge DAC number so that the positive edge time of a third pulse waveform of a third amplitude substantially equals a desired edge time.

16. A system for providing variable edge control of pulse waveforms, comprising:

means for selecting a first amplitude for a first pulse waveform;

means for setting a first negative edge digital-to-analog converter (DAC) number so that the negative edge time of the first pulse waveform is substantially equal to an initial edge time;

means for selecting a second amplitude for a second pulse waveform;

means for setting a second negative edge DAC number so that the negative edge time of the second pulse waveform is substantially equal to the initial edge time; and means for generating from the first and second negative edge DAC numbers a negative gain factor and a negative offset factor to be used in calculating a third negative edge DAC number so that the negative edge time of a third pulse waveform of a third amplitude substantially equals a desired edge time.

* * * * *